Figure 1:
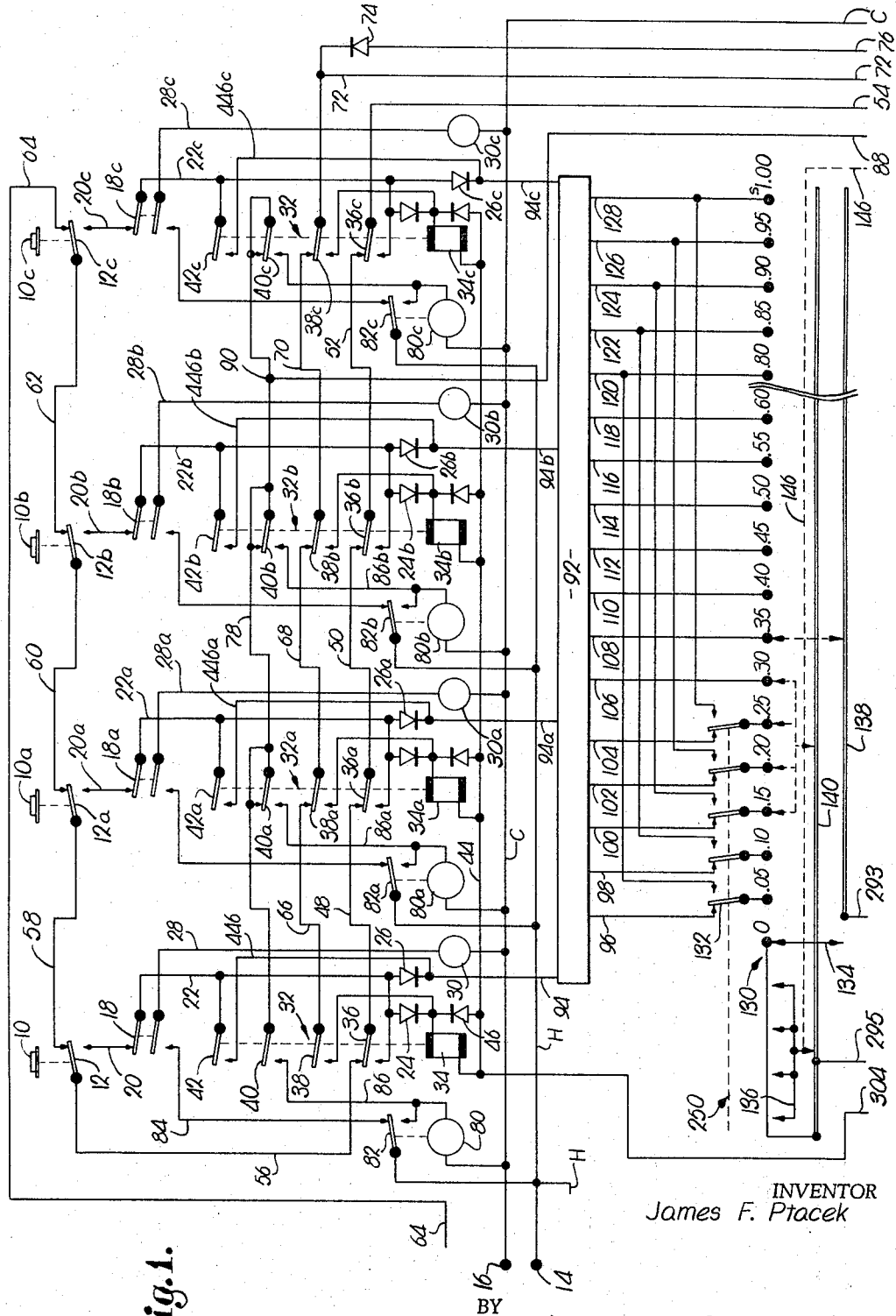

United States Patent Office 3,367,467
Patented Feb. 6, 1968

3,367,467
CONTROL APPARATUS FOR MULTIPLE PRICE
VENDING MACHINE
James F. Ptacek, Independence, Mo., assignor to The
Vendo Company, Kansas City, Mo., a corporation of
Missouri
Filed Oct. 25, 1966, Ser. No. 589,295
12 Claims. (Cl. 194—4)

This invention relates to improvements in control circuitry for vending machines and includes a control arrangement utilizing a single deposit totalizer which allows the customer to deposit either a bill or coins to establish proper credit.

With the development and increased usage of variable price, post select vending machines, it has become commercially advantageous to provide such machines with means for receiving a deposit of paper money as well as coins. Manifestly, the addition of a bill detector and validator unit to a vending machine appreciably increases the cost of the machine, particularly if separate deposit totalizing and credit establishing apparatus is utilized in conjunction with the bill detector, in addition to the normal coinage deposit totalizer.

It is, therefore, the primary object of this invention to provide a deposit totalizing and credit establishing means which is compatible with the deposit of both coins and bills, thereby reducing the complexity of the vending machine control circuitry with attendant reduction in the cost thereof.

As a corollary to the foregoing object, it is an important aim of the instant invention to provide a deposit totalizing arrangement which responds to the deposit of coins in the normal manner, but which responds to the deposit of a bill as if a coin of predetermined denomination were deposited, wherein the control circuitry responds to the action of the totalizer when a bill is deposited to permit vending in accordance with the actual credit of the customer rather than the lesser credit registered by the totalizer.

Another object is to provide means for effectively disabling the currency acceptor if the customer chooses to deposit coins and, alternatively, for effectively disabling the coin acceptor if a bill is deposited by the customer.

Additionally, since post select vending machines must necessarily hold a deposit in escrow until the selection is made, it has heretofore been possible in some instances for an unscrupulous customer to effect return of a deposit and still cause the vend cycle to be initiated by momentarily interrupting the power to the vending machine after the deposit is made. Of course, such a condition could also occur during momentary power failures. It is, therefore, another important object of this invention to provide vending machine control circuitry which utilizes normally energized relays to control the acceptance and the return of deposits, wherein the circuitry is arranged such that a deposit in escrow is accepted after a power interruption to prevent the customer from effecting return of the deposit.

A further object is to provide a means of effecting de-energization of the normally energized relays without utilizing switches to break the energizing circuits thereto, so that the cost and complexity of the circuitry will be further reduced.

Figure 2:
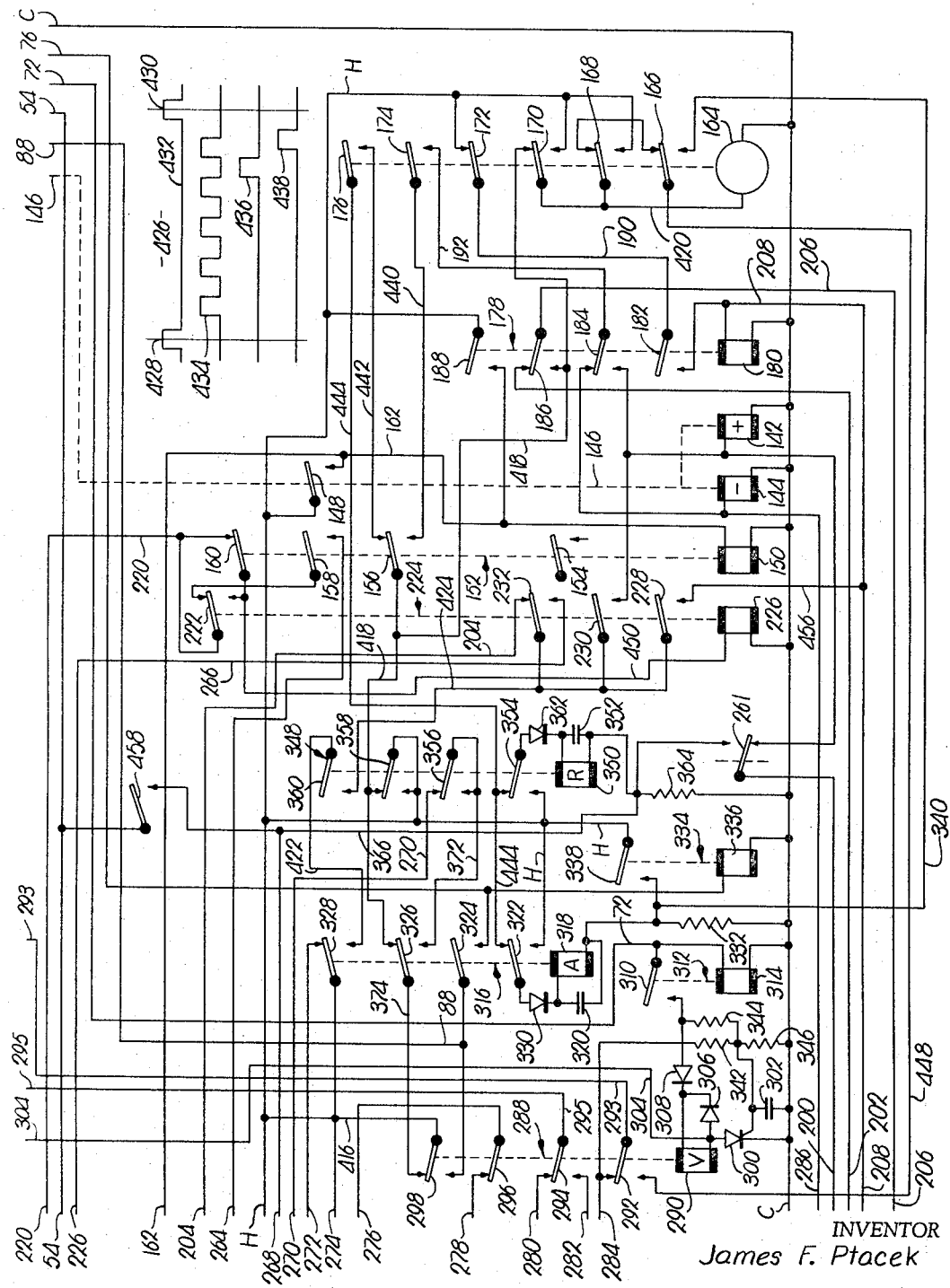
Figure 3:
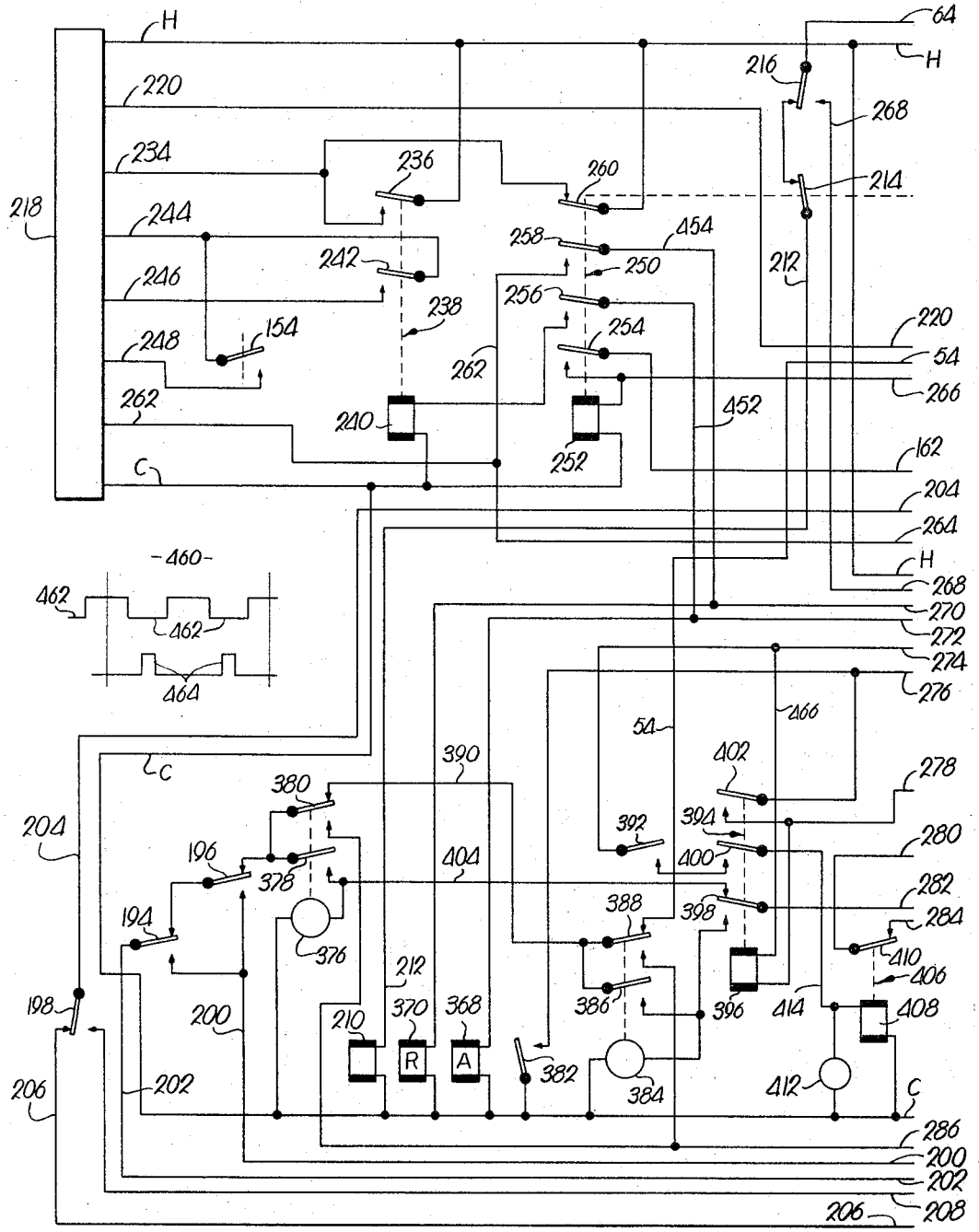

In the drawings:

FIGURE 1 is an electrical schematic diagram showing the selector switches, selection relays, vend motors, price setter, and totalizer terminals and wiper of the vending machine control apparatus;

FIG. 2 is an electrical schematic diagram showing the remainder of the totalizer, control circuitry therefor, the vend, accept coins and return coins relays, and the timing motor and associated contacts, a timing graph being illustrated to show the operational sequence of the timing contacts; and FIG. 3 is an electrical schematic diagram showing the deposit station, the coin return and coin accept solenoids, and circuitry associated with change payout, the three figures being interconnected by leads of common designation to form a composite schematic diagram of the control apparatus.

Article selection

Four selector buttons 10, 10a, 10b and 10c are illustrated in FIG. 1 associated with respective selector switches 12, 12a, 12b and 12c. Each of the selector buttons corresponds to a particular article to be vended, it being understood that the showing of four buttons is purely exemplary. It will be appreciated hereinafter that each article may be of a different price within a range of values from 5¢ to $1.00. Each of the selector circuits associated with a particular selector button and selector switch is identical; hence, only the circuit associated with button 10 will be described in detail, corresponding components of the three other selector circuits being designated by the same reference numeral with the addition of the "a," "b" and "c" notation.

Line voltage is applied across terminals 14 and 16, the latter being regarded hereinafter as the common side of the line, while terminal 14 will be assumed to represent the high or "hot" side of the line. An alternating current supply is connected to terminals 14 and 16, it being understood that this nomenclature is utilized herein solely for purposes of clarity and ease of description.

The upper pole of a double-pole Sold-Out switch 18 normally engages a contact which is connected by lead 20 to the normally open contact of selector switch 12, the upper pole being connected by a lead 22 to a pair of isolation diodes 24 and 26. The lower pole of switch 18 is connected by a lead 28 to a Sold-Out lamp 30 which is, in turn, connected to common line C.

A selection relay 32 has a coil 34 mechanically coupled with four switches 36, 38, 40 and 42. The anode of diode 24 is connected to the lower contact of switch 36, the cathode thereof being connected to one side of coil 34. The other side of the coil is connected to a lead 44 common to the coils 34a, 34b and 34c of the three other selection relays 32a, 32b and 32c. A diode 46 shunts coil 34 for the purpose of reducing chattering of the relay armature.

The various relays 32a, 32b and 32c are normally de-energized and are shown in such condition which corresponds to the standby state of the control apparatus. The pole relay switch 36 is connected to the normally closed contact of switch 36a by lead 48, the pole of switch 36a being connected to the normally closed contact of switch 36b by a lead 50. In like manner, switches 36b and 36c are interconnected by a lead 52, the pole of switch 36c being connected to other sections of the apparatus by a lead 54. The normally closed contact of switch 36 extends to switch 12 by a lead 56, switches 12, 12a, 12b and 12c being connected in series by a lead 58 interconnecting the normally closed contact of switch 12 and the pole of switch 12a, and leads 60 and 62 interconnecting switches 12a, 12b and 12c in like manner. The normally closed contact of switch 12c extends to other sections of the circuitry via lead 64.

Relay switches 38, 38a, 38b and 38c are connected in series by leads 66, 68 and 70 in a manner analogous to the series interconnection of switches 36, 36a, 36b and 36c described above. The pole of switch 38c extends to other portions of the apparatus via lead 72 and through a diode 74 to other circuitry via lead 76.

A lead 78 extends from the pole of relay switch 40 to the normally closed contact and the pole of relay switch 40c, both the normally closed contacts and the movable poles of switches 40a and 40b being connected to lead 78 at intermediate points therealong. A vend motor 80 is connected in series between common line C and the normally open contact of switch 40, motor 80 being provided with a carry-over switch 82 operated thereby which establishes a holding circuit from the hot line H to motor 80 upon actuation of switch 82 to move the pole thereof into engagement with the lower contact of the switch. The normally closed contact of switch 82 is connected to the normally open contact of the lower pole of Sold-Out switch 18 by a lead 84. The other vend mitors 80a, 80b and 80c are also equipped with respective carry-over switches 82a, 82b and 82c which are interconnected with corresponding selector circuits in like manner.

The high side of vend motor 80 is connected to the normally open contact of relay switch 40 by a lead 86 for the purpose of providing an initial power circuit to the vend motor via lead 78 and switch 40 upon energization of relay coil 34. Power is supplied to lead 78 by a lead 88 which extends to other portions of the circuitry and is interconnected with lead 78 at junction joint 90.

*Price setter and totalizer*

A price setter 92 is diagrammatically illustrated in FIG. 1 and has connections thereto from respective selector circuits via leads 94, 94a, 94b and 94c, the latter extending from the cathodes of corresponding diodes 26, 26a, 26b and 26c. The price setter is a conventional pricing switch arrangement which selectively connects each of the leads 94, 94a, 94b and 94c to a desired price representing connection 96, 98, 100, 102, 104, 106, 108, 110, 112, 114, 116, 118, 120, 122, 124, 126 or 128. Connections 96–128 represent prices from 5¢ to $1.00, respectively, in 5¢ increments.

A series of deposit registering terminals designated 5¢–$1.00 comprise a part of a stepper relay 130 which forms the primary component of the deposit totalizer. Five single-pole, double-throw switches 132 are ganged together and comprise a part of a relay 250 to be described hereinafter, switches 132 normally coupling connections 96–104 representing prices of 5¢–25¢ to respective deposit registering terminals designated 5¢–25¢. Switches 132, when operated to place the poles thereof in engagement with associated right-hand contacts, then couple price connections 120–128 representing prices of 80¢–$1.00 to the registering terminals designated 5¢–25¢. It will be appreciated hereinafter that this is effected when a one dollar bill is deposited in the apparatus so that such deposit will enable purchase of a selection priced in the range of 80¢ to $1.00 although actual physical operation of the totalizer is the same as for a 25¢ deposit. As illustrated, price connections 106–128 always connect directly to respective registering terminals designated 30¢–$1.00.

The totalizer relay 130 includes a dual section wiper having a contact element 134 shown in engagement with the "0" registering terminal. The second section of the wiper is illustrated at 136 and comprises four spaced contacts which are electrically interconnected and move with element 134. The wiper 134, 136 is illustrated in full lines in its home or "zero" credit position, the broken line registration of the wiper representing an accumulated credit of 35¢. As the wiper steps from position to position during operation of the totalizer, contact element 134 sequentially addresses the registering terminals and connects a particular terminal to an electrical connection point 138 in each position. Simultaneously, contact section 136 addresses the four terminals of progressively lower value than the terminal addressed by element 134, section 136 bridging such lower valued terminals and an electrical connection point 140. Connection points 138 and 140 are illustrated as comprising contact tracks engaged by the wiper, and it will be appreciated herein-after that each of the connection points 138 and 140 is common to circuits which may be alternatively established through the totalizer terminals and price setter 92 depending upon whether the customer deposits a bill or coins in the vending machine.

Additional components of totalizer relay 130 are shown in FIG. 2. An "add" solenoid 142 and a "subtract" solenoid 144 are mechanically coupled to wiper 134, 136 as illustrated diagrammatically by the broken line 146. A zero credit switch 148 is also operated by the mechanical coupling 146, switch 148 being in the open condition illustrated only when zero credit is registered by the totalizer. Closure of switch 148 effects energization of the coil 150 of a zero credit relay 152 having four switches 154, 156, 158 and 160. Power line H may be seen in FIG. 2 connected to the pole of switch 148, a lead 162 being connected between the normally open contact of the switch and one side of relay coil 150. The common line C is connected to the other electrical side of coil 150 and forms the common return connection for solenoids 142 and 144, as well as other electrically operated components in FIG. 2 to be described hereinafter.

A pulse and timing motor 164 operates six cam switches 166, 168, 170, 172, 174 and 176 which form a part of the totalizer, as well as other sections of the control apparatus. Switch 166 is an accept delay switch which delays the acceptance of deposited coinage from escrow until an appropriate time in the cycle of motor 164. Switches 168 and 170 are motor operating and carry over switches for the timing motor 164. Switch 172 controls the operation of a 25¢ hold relay 178 having a coil 180, and four switches 182, 184, 186 and 188. A lead 190 interconnects the poles of switches 172 and 182. Cam switch 174 is a pulse-producing switch which effects the delivery of five pulses along a lead 192 during each cycle of motor 164. Switch 176 is a normally open reset switch which is utilized for a purpose to be explained hereinafter.

It should be understood at this juncture that the deposit of a nickel causes solenoid 142 to be momentarily energized to move the totalizer wiper one step, the deposit of a dime effecting energization and then de-energization of solenoid 142 twice to cause the wiper to step two increments. When a quarter is deposited, solenoid 142 is momentarily energized five times by the joint action of the nickel switch 194 (for the first pulse) and the five pulse switch 174 which delivers four additional pulses. Additionally, it will be seen hereinafter that the totalizer responds to a deposit of a one dollar bill in the same manner as a deposit of a quarter, the totalizer wiper being advanced five steps in each case. The subtract solenoid 144 is utilized to return the totalizer wiper to the home or zero credit position after a vend is effected.

*The deposit station*

The circuitry of the vending machine deposit station is illustrated in FIG. 3. A nickel-operated coin switch 194, a dime-operated coin switch 196, and a quarter-operated coin switch 198 are illustrated in their normal positions. The coin channels in the coin acceptor are arranged such that all coins will first strike the nickel switch 194 causing leads 200 and 202 to be momentarily interconnected, energizing add solenoid 142. Leads 200 and 202 are also momentarily interconnected upon closure of dime switch 196. Operation of quarter switch 198 breaks a circuit normally existing along leads 204 and 206 and connects lead 204 in series with a lead 208 which is, in turn, connected to the high side of relay coil 180. A coin return electromagnet 210 is connected to common line C and a lead 212 which is connected to a normally closed switch 214, the latter being connected in series with a customer-operated coin return switch 216 and lead 64 from FIG. 1. During times when lead 64 is connected to line H, electromagnet 210 is maintained in an energized condition to permit deposited coins to pass through the coin channels of the acceptor and actuate the appropriate coin sensing switches 194, 196 and 198. De-energization of electromagnet 210 moves blocking fingers into the coin channels to divert deposited coins to a coin-return chute. The blocking fingers, coin channels, and coin-return chute comprise conventional structure found in a variety of commercially obtainable coin acceptors and hence are not illustrated herein.

A bill validator and escrow unit 218 is diagrammatically illustrated in FIG. 3 and may comprise apparatus such as shown and described in Riddle et al., U.S. Letters Patent No. 3,256,968, granted June 21, 1966, which is incorporated hereby by reference as may be necessary for a full understanding of the structure and operation of unit 218. Power is supplied to unit 218 by lines H and C, a credit pulse lead 220 extending from unit 218 to the normally closed contact of switch 160 in FIG. 2. Lead 220 is also connected to one of the switches 222 of a dollar credit pulse relay 224 having a coil 226 operating switches 228, 230 and 232 in addition to switch 222. Unit 218 has a reversible drive motor (not shown) connected between line C and a lead 234, the latter being connected to line H upon closure of a normally open switch 236 of a bill accept relay 238. Relay 238 has a coil 240 and another normally open switch 242, the latter, upon closure thereof, interconnecting a pair of leads 244 and 246 extending from unit 218. A lead 248 utilized for control purposes to be explained hereinafter is connected to the normally open contact of switch 154 of the zero credit relay 152, the pole of switch 154 being connected to lead 244. To avoid long interconnecting leads in the drawings, switch 154 may be found in both FIGS. 2 and 3, the latter figure showing the actual electrical connections made to such switch.

A dollar credit hold relay 250 has a coil 252 and eleven switches operated thereby including five switches 254, 256, 258, 260 and 261, the normally open contact of switch 258 being connected to a control lead 262 emanating from unit 218 and utilized when it is desired to return a deposited bill to the customer from bill escrow. Switch 261 is shown in FIG. 2 and is interposed in series with lead 200. The six remaining switches of relay 250 comprise switch 214 and the five switches 132 (FIG. 1).

A lead 264 connects with lead 262 and extends to FIG. 2 where the same is connected to the normally open contact of switch 158 of the zero credit relay 152. Other leads which interconnect the circuitry of FIGS. 2 and 3 include the lead 54 which is connected to switch 36c in FIG. 1, a lead 266 interconnecting relay coil 252 and the normally open contact of switch 232, the lead 162 from FIG. 2 which is connected to switch 254 in FIG. 3, a lead 268 connected to the normally open contact of coil return switch 216, and leads 270, 272, 274, 276, 278, 280, 282, 284 and 286 which are common to FIGS. 2 and 3 and are utilized in circuitry to be subsequently described.

*Vend circuit, change payout, and coin acceptance and return*

A vend and changer control relay 288 has a coil 290 and four switches 292, 294, 296 and 298. A lead 293 interconnects the pole of switch 292 and connection point 138 of the totalizer (FIG. 1), a lead 295 interconnecting the pole of switch 294 and connection point 140 of the totalizer. The anode of a silicon controlled rectifier 300 is connected to one electrical side of coil 290, the cathode thereof being connected to common line C. A capacitor 302 is connected between the gate of SCR 300 and line H. A lead 304 interconnects the SCR anode and lead 44 in FIG. 1 which is common to the selector relay coils 34, 34a, 34b and 34c. A diode 306 is connected across coil 290 to reduce chattering, and a diode 308 connects the high side of coil 290 with the normally open contact of a switch 310, the latter being a component of a selection start delay relay 312 and operated by the coil 314 thereof. The SCR gate is connected to lead 284 by a resistor 342, and to the normally open contact of switch 310 by a resistor 344. A resistor 346 is connected between the SCR gate and common line C.

An accept coins relay 316 has a coil 318 shunted by a capacitor 320 and four switches 322, 324, 326 and 328. Relay 316 is shown de-energized but is normally maintained in its energized state, i.e., relay 316 is energized when the control apparatus is in standby. A diode 330 interconnects the pole of switch 322 and the high side of coil 318, the return side of the coil being connected to common line C through a resistor 332. An antijackpot, five second delay relay 334 has a coil 336 and a switch 338, the normally open contact thereof being connected to the low side of coil 318 and by a lead 340 to the normally open contact of switch 166. The pole of switch 338 is maintained at line potential by line H.

A return coins relay 348 has a coil 350 shunted by a capacitor 352, and four switches 354, 356, 358 and 360. A diode 362 connects the movable pole of switch 354 with the high side of coil 350, the return side thereof being connected to common line C through a resistor 364. Lead 268 from the normally open contact of coin return switch 216 (FIG. 3) is connected to a lead 366 which is, in turn, connected to the return side of coil 350. Like the accept coins relay 316, the return coins relay 348 is also shown in its de-energized condition but is operated normally energized. Therefore, unlike the other relays of the system, relays 316 and 348 are energized when the circuitry is in standby and effect a control function during operation of the apparatus upon de-energization thereof.

Lead 272 connects the upper contact of switch 328 of the accept coins relay 316 to a coin accept solenoid 368 shown in FIG. 3. The pole of switch 328 is connected to lead 274 which is, in turn, connected to line H. A coin return solenoid 370 is connected to the upper contact of switch 356 of the return coins relay 348 (FIG. 2) by lead 270. The pole of switch 356 and the lower contact thereof are connected by a lead 372 to the lower contact of switch 326 of the accept coins relay 316, the movable pole of switch 326 being connected to the normally closed contact of switch 298 by a lead 374. The coin accept solenoid 368 and the coin return solenoid 370 are conventional components of commercially available coin mechanisms, energization of the accept solenoid being effective to transfer deposited coins from escrow to the cashbox, while energization of the return solenoid is customer-controlled and effects return of coins in escrow to the customer.

Referring to FIG. 3, a coin payout motor 376 is shown in association with a motor carry-over switch 378 and a subtract pulse switch 380, both cam operated by motor 376 during rotation of its output shaft. Motor 376 forms a part of a conventional nickel payout mechanism (not shown) which utilizes a coin-discharge slide in conjunction with a nickel storage tube to pay out nickels to a customer when change is required. Motor 376 drives the nickel payout slide in the usual fashion, a nickel being paid out during each 180° of shaft rotation.

A normally open coin tube switch 382 is associated with the nickel storage tube of the changer and closes when such tube becomes depleted to a predetermined level. The pole of switch 382 is connected to common line C, the normally open contact thereof being connected to lead 276.

An auxiliary coin payout motor 384 utilizes a motor carry-over switch 386 and operates a subtract pulse switch 388, the pole of switch 388 being connected to the normally closed contact of subtract switch 380 by a lead 390. Motor 384 operates in a fashion analogous to motor 376 and is utilized to drive the nickel payout slide of an auxiliary change payout mechanism, also not shown. An auxiliary coin tube switch 392 is normally in the open condition and is associated with the nickel supply tube of the auxiliary change payout mechanism, switch 392 closing when the auxiliary supply tube becomes depleted to a predetermined degree.

A changer transfer relay 394 has a coil 396 and three switches 398, 400 and 402, the normally closed contact of switch 398 being connected to the high side of change payout motor 376 by a lead 404. A correct change relay 406 has a coil 408 and a single switch 410 which normally interconnects leads 280 and 284. A "Correct Change" light 412 is connected across coil 408 between common line C and a lead 414 interconnecting the high side of coil 408 and the pole of switch 400.

*The standby state*

The apparatus assumes a standby state when line voltage is applied across terminals 14 and 16. It will be recalled that the accept coins relay 316 and the return coins relay 348 are energized in standby, while the remaining components of the system are normally de-energized except for the coin return electromagnet 210. Application of line voltage to terminals 14 and 16 (FIG. 1) establishes the following electrical circuit: From terminal 14 along the extension of line H seen in FIG. 3 to the extension of line H in FIG. 2, along a lead 416 from line H to switch 298, along lead 374 to switch 326, along a lead 418 to the normally closed contact of timer motor switch 170, and thence along a lead 420 to timer motor 164 and return line C. This energizes motor 164, the latter then establishing a holding circuit through carry-over switch 168 which has its lower contact connected directly to line H.

In the event that there are coins in escrow at the time power is applied to terminals 14 and 16, these coins will be accepted and transferred to the cashbox by virtue of the following electrical circuit: From line H in FIG. 2, along lead 416 to lead 274 connected to switch 328 of the accept coins relay, through switch 328 (since the accept coins relay is deenergized) to lead 272, and thence along lead 272 (FIG. 3) to the coin accept solenoid 368 and common line C.

It should also be noted that timing motor 164 will be energized during normal usage of the vending machine with power applied to terminals 14 and 16, in the event that a customer should make a deposit of coins and decide to effect return of the coins from escrow before making a selection. The energizing circuit for motor 164 is as follows: From the extension of line H in FIG. 2 to the pole of switch 358 of the return coins relay, and thence through the upper contact of switch 358 and along lead 418 to motor switch 170 as before.

This circuit to motor 164 is made possible by the de-energization of coil 350 of the return coins relay, which is effected by the customer by actuation of the coin return switch 216 (FIG. 3). Such actuation establishes the following electrical circuit: From line H in FIG. 2 along leads 416 and 274 to switch 328 (now establishing a circuit through its lower contact since the accept coins relay will be enerized), along lead 422 to switch 360 (now closed against its lower contact since the return coins relay will still be energized at this time), along a lead 424 to switch 232, along lead 204 to the quarter switch 198 in FIG. 3, along lead 206 to switch 186 in FIG. 2, along lead 202 to the nickel switch 194 in FIG. 3, through the dime switch 196 and subtract pulse switch 380 to lead 390 and switch 388, along lead 54 through FIG. 2 to switch 36c in FIG 1, along series connected leads 52, 50, 48, 56, 58, 60 and 62 to switch 12c, along lead 64 over to the coin return switch 216 in FIG. 3, along lead 268 upon actuation of switch 216 to lead 366 in FIG. 2, and thence along lead 366 to the return side of relay coil 350 of the return coins relay 348. This de-energizes coil 350 since the potential of line H is now applied to both sides of coil 350. As the relay drops out, its holding circuit through switch 354 is broken. Therefore, the coin return solenoid 370 is energized by the following circuit: From line H in FIG. 2 along lead 416 to switch 298, along lead 374 to switch 326 (now establishing a circuit through its lower contact since the accept coin relay 316 will be energized), along lead 372 to switch 356 (now establishing a circuit through its upper contact since the return coins relay is de-energized), and thence along lead 270 to the coin return solenoid 370 in FIG. 3.

From the foregoing it will be appreciated that the accept coins relay 316 must be energized before a circuit can be established to the coin return solenoid 370 and, furthermore, that the coin accept solenoid 378 is immediately energized upon application of power to terminals 14 and 16. Therefore, a customer is positively precluded from making a deposit, interrupting power to the machine, subsequently reestablishing power to the machine, and then obtaining return of the deposit from escrow.

The two energizing circuits to timing motor 164 traced above, one established pursuant to normal operation of the coin return switch and the other pursuant to application of power to terminals 14 and 16 after a period of dormancy, effect return of the control apparatus to the standby state in a manner to be now described. A timing graph 426 is shown in FIG. 2 and illustrates the opening and closing of the various switches associated with motor 164 during 180° of rotation of the motor shaft. The first plot represents the operation of carry-over switches 168 and 170, intervals 428 and 430 representing the times during which switches 168 and 170 are in the normal positions illustrated. The relatively long duration 432 between intervals 430 illustrates that both switches are in engagement with their normally open contacts to maintain motor 164 energized.

The second plot illustrates a pulse train 434 comprising five pulses produced during duration 432 by the pulse switch 174. Each pulse corresponds to closure of switch 174.

The third plot illustrates an interval 436 which represents the time period in which the 25¢ relay control switch 172 and the reset switch 176 are in their off-normal conditions. The fourth plot illustrates that the accept delay switch 166 is off-normal during a brief interval 438. Each additional 180° of rotation of the timing motor shaft again causes the various cam switches to be operated in a sequence identical to that illustrated by timing graph 426.

When motor 164 is initially energized, it will be appreciated that the five closures of pulse switch 174 commence after the carry-over switches establish a holding circuit to timing motor 164. A lead 440 interconnects the movable pole of switch 174 and the normally open contact of switch 156 of the zero credit relay 152. The zero credit relay will be de-energized if there is no credit established in the apparatus; therefore, under such condition closures of pulse switch 174 have no affect on the circuitry. Later in the cycle during interval 436, reset switch 176 closes and affects the energization of coils 318 and 350 of the accept coins and the return coins relays via the following circuit: From line H in FIG. 2 to switch 358, along lead 418 to switch 156, along a lead 442 to the now closed reset switch 176, along a lead 444 to switches 354 and 322, and thence through diodes 362 and 330 to coils 350 and 318. Energization of the relays causes switches 322 and 354 to establish holding circuits through their lower contacts which are connected to an extension of line H. The other switches operated by timing motor 164 are not utilized during establishment of the standby state of the circuitry from a dormant condition.

The circuitry is returned to the standby state during normal operation after actuation of the coin return switch 216 in the same manner as just described, except that the accept coins relay 316 will already have been energized, requiring only that the return coins relay 348 be reset. Since some coins will have been returned from escrow by the de-energization of the return coins relay, a credit will necessarily have been established in the machine which must be removed. The pulse switch 174 effects such removal to reestablish a zero credit condition in a manner analogous to the removal of credit after a vend is initiated and will be discussed hereinafter.

*Exact price vending*

Assuming that a customer has 35¢ in change and that he desires to purchase a 35¢ article corresponding to selector button 10b, the 35¢ in coin is deposited in the machine to cause the totalizer 130 to register a deposit of 35¢, as illustrated in FIG. 1 by the broken line representation of the totalizer wiper. If a dime and then a quarter are deposited, the dime first strikes nickel switch 194 and then dime switch 196, causing add solenoid 142 to be momentarily energized twice via the following circuit: From line H in FIG. 2 along leads 416 and 274 to switch 328, along lead 422 to switch 360, along lead 424 to switch 232, along lead 204 to quarter switch 198 in FIG. 3, along lead 206 to switch 186 in FIG. 2, along lead 202 to the nickel and dime switches 194 and 196 in FIG. 3, and thence along lead 200 to the add solenoid 142 as the nickel and dime switches are successively closed by the dime. The wiper is thus advanced two steps. When the quarter is subsequently deposited, the wiper then advances one additional step as the quarter strikes nickel switch 194. The four steps still required in order to register a 35¢ deposit are produced after the quarter strikes quarter switch 198, the latter then momentarily interconnecting leads 204 and 208 to energize the coil 180 of the 25¢ hold relay 178. A holding circuit for coil 180 is established upon closure of switch 182 via lead 190, switch 172 and line H. When the quarter switch 198 returns to its normal position, lead 204 is reconnected to lead 206 to now establish a circuit through the lower contact of switch 186 and along lead 418 to motor switch 170. This energizes timing motor 164 to cause the pulse switch 174 to commence the five closures illustrated at 434. Since 15¢ in credit has already been registered, zero credit switch 148 is now closed and lead 162 is thus connected to line H. This effects the energization of relay coil 150 of the zero credit relay 152, thereby operating switch 156 to establish a circuit through the lower contact thereof to pulse switch 174 via lead 440. Since lead 418 is now connected to lead 206 through switch 186, line voltage is applied to the movable pole of switch 174. Therefore, repeated closure of pulse switch 174 pulses add solenoid 142, four pulses 434 being delivered thereto before the 25¢ relay control switch 172 opens during interval 436. Opening of switch 172 breaks the holding circuit to relay coil 180, thereby returning the 25¢ hold relay 178 to normal. A deposit of 35¢ is now registered by the totalizer relay. Operation of the accept delay switch 166 during interval 438 will be ineffective since the selection has not as yet been made.

Depressing of selector button 10b operates selector switch 12b and establishes the following potential energizing circuit to the coil 34b of selection relay 32b: From line H in FIG. 2 along leads 416 and 274 to switch 328, along lead 422 to switch 360, along lead 424 to switch 232, along lead 204 to quarter switch 198 in FIG. 3, along lead 206 to switch 186 in FIG. 2, along lead 202 to the nickel and dime switches 194 and 196 in FIG. 3, through switch 380 and along lead 390 to switch 388, along lead 54 across FIG. 2 to switch 36c in FIG. 1, along series connected leads 52, 50, 48, 56, 58 and 60 to the now operated selector switch 12b, through Sold-Out switch 18b and along lead 22b to diode 24b, through coil 34b to lead 44, along lead 304 to SCR 300 in FIG. 2, and thence through the anode-cathode circuit of the SCR to return line C. Since SCR 300 is normally in its nonconductive state, it must be gated before continuity will exist in the circuit just traced.

To render SCR 300 conductive, a branch circuit created by the depressing of button 10b is established from lead 22b through diode 26b and along lead 94b to price setter 92, through the price setter to the 35¢ price connection 108, through the 35¢ totalizer terminal to common point 138 via contact element 134, along lead 293 to switch 292 in FIG. 2, and thence along lead 284 and through resistor 342 to the gate of SCR 300. Thus, the price setter does not permit energization of a particular selection relay if an insufficient deposit has been made, since the branch circuit through the price setter and appropriate totalizer terminal is necessary to gate the SCR 300 and establish continuity in the power circuit to such relay.

A holding circuit for selection relay coil 34b is established by switch 36b through its lower contact. Operation of switch 38b by the energization of relay coil 34b establishes the following circuit to the coil 314 of the selection start delay relay 312: From switch 36b through diode 24b to switch 38b, along lead 70 to switch 38c and along lead 72 to relay coil 314. Relay 312 is a hydraulic relay of the slow-to-pull-in type having approximately a one-half second delay time to assure that all coins deposited have sufficient time to actuate the appropriate coin switches. Closure of switch 310 then makes power available to the coil 290 of vend relay 288 via a current path through diode 308, the return side of coil 290 being connected to return line C by the conducting SCR 300. Energization of the vend relay establishes an energizing circuit to vend motor 80b as follows: From line H along lead 416 to switch 298 along lead 88 to junction point 90 in FIG. 1, along lead 78 through switch 40b, and thence along lead 86b to vend motor 80b. Carryover switch 82b then maintains vend motor 80b energized until the end of the vend cycle.

Energization of vend relay 288 also establishes the following electrical circuit to effect operation of timing motor 164: From lead 52 through switch 36b to lead 22b, through switch 42b and along a lead 446b to lead 94b, through price setter 92, connection 108, and the 35¢ registering terminal to connection point 138, along lead 293 to switch 292, along lead 448 to switch 166, and thence through carry-over switch 168 to the motor 164. Repetitive operation of pulse switch 174 thus commences, but operation of the pulse switch is ineffective at this time since the accept coins relay 316 is energized and a current path through the upper contact of switch 326 is unavailable. During interval 438, the accept delay switch 166 is operated to interconnect leads 340 and 448 to, in turn, effectively connect line H to the return side of accept relay coil 318. This drops out the accept coins relay 316 and breaks the holding circuit therefor, whereupon the circuit through switch 328 along lead 272 to the coin accept solenoid 368 previously traced is established to transfer the deposit from escrow to the cashbox. Operation of accept delay switch 166 is purposely delayed a sufficient time to allow for the inherent delay in the start-up of the vend motor associated with the selected article.

With the accept coins relay 316 de-energized, it will be appreciated that power is removed from the selection relay coil 34b by the operation of switch 328. Also, the power circuit is broken to relay coil 314 and coil 290 of vend relay 288.

With the vend relay and the accept coins relay de-energized, power is made available to the five pulse switch 174 through switches 298 and 326 in the positions shown. Therefore, the next cycle of timing motor 164 will be effective to deliver pulses to the subtract solenoid 144 since the 25¢ hold relay 178 has dropped out. Operation of timing motor 164 continues until the totalizer wiper homes and contact element 134 engages the zero registering terminal, whereupon reopening of zero credit switch 148 de-energizes relay coil 150, the latter operating switch 156 to return the latter to the normal position shown whereby the reset switch 176 is then effective to cause re-energization of accept relay coil 318 to thus return the accept coins relay 316 to normal.

*Exact price operation with bill deposit*

Operation of the apparatus when a bill is deposited in unit 218 is similar to that described above for the deposit of a quarter. However, the circuitry is actuated in a manner to actually give the customer a credit of $1.00 rather than 25¢. In the following example it is assumed that the price of the article is $1.00 and that the article corresponds to selector button 10b.

The drive motor of bill detector unit 218 is actuated when a bill of correct density is placed in the input chute of the unit. The motor obtains power via lead 234 (through switch 260) and the common line C and operates a conveyor which transfers the deposited bill through a test zone in the unit and to an escrow, if valid. The bill is tested for validity by the electronics of unit 218 and, if invalid, a credit pulse is not produced or circuitry within unit 218 effects reverse of the motor to return the bill to the customer. If it is determined that the bill is valid, a credit pulse is delivered along lead 220. This establishes a circuit through switch 160 and a lead 450 to the coil 226 of the dollar credit pulse relay 224. This operates switch 232 to establish the following electrical circuit: From line H in FIG. 2 along leads 416 and 274 to switch 328, along lead 422 to switch 360, along lead 424 to switch 232, along lead 266 to coil 252 in FIG. 3, and thence to the return line C. The dollar credit hold relay 250 thus pulls in, closing switch 256 and connecting the coil 240 of the bill accept relay 238 to a lead 452 which is, in turn, connected to lead 272.

It will be recalled that lead 272 is also connected to the coin accept solenoid 368; therefore, when the accept coins relay 316 subsequently drops out during the vend cycle, coil 240 will be energized to effect bill acceptance. This is achieved by the closing of switch 236 which reapplies power to the drive motor of unit 218 to discharge the bill into the strong-box of unit 218, the power having been previously removed by the opening of switch 260 to hold the bill in escrow. Control connections for the electronics of the bill acceptor are illustrated by leads 244 and 246 which are interconnected by the closing of switch 242. In the event that, prior to acceptance of the bill, the customer desires to have the bill returned, this is made possible by the previous closure of switch 258 of the dollar credit hold relay 250 which connected the control lead 262 to lead 270 via lead 454. Lead 262 may, for example, be connected to a motor reverse relay within unit 218, arranged to effect reverse operation of the motor when excitation is applied to lead 262. Lead 270 is connected to the coin return solenoid 370; therefore, operation of the coin return switch 216 now energizes lead 262 to return the bill to the customer.

Operation of the dollar credit pulse relay 224 also, by virtue of the closing of switch 230, connects the high side of the line to add solenoid 142 to advance the totalizer wiper one step. This closes zero credit switch 148 to, in turn, energize coil 150 of the zero credit relay 152 via lead 162. This opens switch 160 to the dollar credit pulse relay coil 226. The coil 252 of the dollar credit hold relay 250 (FIG. 3) remains energized by virtue of a holding circuit through switch 254 which extends from the closed zero credit switch 148 via lead 162.

Prior to de-energization of relay coil 226, closure of switch 228 is effective to energize the 25¢ hold relay coil 180 by a circuit from lead 424 through switch 228, and then along a lead 456 to lead 208. Coil 180 is maintained energized by a holding circuit through switch 182. Motor 164 is now rendered operative in the same manner as if a quarter were deposited due to the movement of the pole of switch 186 into engagement with its lower contact. Four additional pulses are thus supplied to the add solenoid 142 by the operation of pulse switch 174 during the cycle of motor 164.

Although the totalizer will only register a 25¢ deposit when a dollar is deposited, the action of dollar hold relay 250 permits the circuitry to recognize that the actual credit due the customer is $1.00. Referring to FIG. 1, it may be seen that the five switches 132 form a part of relay 250 and are shifted from the positions shown to establish circuits through their righthand contacts upon energization of relay coil 252. Thus, in the instant example, the one dollar price connection 128 of price setter 92 is connected to the 25¢ deposit registering terminal of the totalizer, whereupon contact element 134 of the totalizer wiper extends the circuit to common point 138. Therefore, article selection, acceptance of the deposit, and return of the apparatus to the standby state proceeds in the manner as described above for the deposit of coins, except that the coil 240 of the bill accept relay 238 will now be energized to accept the bill and effect transfer thereof from escrow to the cashbox of unit 218. The one dollar hold relay 250 returns to normal when the holding circuit therefor is broken by re-opening of zero credit switch 148.

*Disabling of bill validator unit when coins are deposited, and vice versa*

Since the circuitry must be able to differentiate between operation of the totalizer to register the deposit of coins and to register the deposit of a one dollar bill, the bill validator unit 218 is effectively disabled if the customer chooses to deposit coins. When a coin deposit is registered, the zero credit switch 148 closes and the zero credit relay coil 150 is energized. This closes switch 154, connections to the latter being illustrated in FIG. 3 where it may be seen that the closing of the switch interconnects leads 244 and 248 of unit 218. Lead 248 is a control lead which prevents unit 218 from accepting currency until switch 154 is once again opened. Lead 244 is common to control leads 246 and 248 and represents a common ground connection within unit 218.

If the customer chooses to deposit a one dollar bill, operation of the dollar credit hold relay 250 opens switch 214, the latter breaking the normal circuit available via lead 212 to the coin return electromagnet 210. Electromagnet 210 is thus de-energized to prevent deposited coins from striking the appropriate coin switches 194–198. Any deposited coins, therefore, are directed to the coin return chute and cannot effect advancement of the totalizer wiper. As an additional safeguard, relay switch 261 of the dollar credit hold relay (shown in FIG. 2) breaks lead 200 from the nickel switch 194 and connects lead 200 to the return side of the return coins relay coil 350; therefore, actuation of the nickel switch by a deposited coin would only cause de-energization of relay coil 350 and effect return of the deposit.

It should be noted that the totalizer has an additional deposit registering terminal which is represented by normally open switch 458 in FIG. 2. When closed, switch 248 completes a circuit from lead 54 to lead 366 to de-energize the return coins relay coil 350. This effects the energization of the coin return solenoid 370 as if the customer had actuated the coin return switch 216. Thus, the customer cannot make a deposit in excess of the credit registering capabilities of the apparatus without effecting automatic return of the deposited coins.

*Change maker operation*

It will now be assumed that, as above, the selected article corresponds to selector button 10b, but that the price thereof is 15¢ and the customer only has a quarter with which to make the purchase. The section 136 of the totalizer wiper has four contacts representing a possible 20¢ change payout. In other words, utilizing the totalizer wiper illustrated, change payback of 5¢, 10¢, 15¢ or 20¢

(but no more) may be effected. If additional change is required, the customer would have to obtain proper change from a source other than the machine.

When a quarter is deposited and contact element 134 reaches the 25¢ terminal, a circuit will be available to connection point 140 through one of the contacts of the second section 136 of the wiper. Thus, when selector button 10b is depressed, a current path is established through the price setter 92 as before, but now along price connection 100 to the 15¢ registering terminal, through wiper section 136 to common point 140, along lead 295 to switch 294, along lead 280 to switch 410 (FIG. 3), along lead 284 to resistor 342, and thence to the gate of SCR 300. This gates the SCR to effect energization of the vend relay coil 290 as in exact price operation.

With the vend relay in its energized state, a circuit is established from lead 295 through switch 294 and along lead 282 to switch 398 (FIG. 3), along lead 404 to the change payout motor 376, and thence to common line C. This operates the change payout motor in a manner as illustrated by graph 460 in FIG. 3, the repetitive intervals 462 representing two periods during one revolution of the motor shaft at which time a nickel is discharged from the coin payout mechanism. Pulse switch 380 is operated to establish a circuit through its normally open contact during the intervals 464, each interval 464 occurring during a corresponding nickel payout interval 462.

With each actuation of pulse switch 380, a circuit is established to the subtract solenoid 144 through the nickel and dime coin switches 194 and 196 and lead 286. Thus, motor 376 will continue to operate and pay out nickels until contact element 134 of the totalizer wiper engages the 15¢ terminal, whereupon a circuit to the vend relay along lead 293 is established as in exact price operation. The circuit through the section 136 of the toalizer wiper to payout motor 376 is broken once the contact element 134 reaches the 15¢ terminal corresponding to the price of the article; therefore, motor 376 is now maintained energized by its carry-over switch 378 for the remainder of the half revolution, switch 378 being arranged to reopen after each nickel payout is completed.

In the event that the nickel storage tube of the changer is depleted, closure of coin tube switch 382 places lead 278, and hence the lower lead from relay coil 396, at the potential of common line C via the following circuit: From line C through switch 382, along lead 276 to switch 296, and along lead 278 to coil 396. The other lead 466 from coil 396 is maintained at the potential of line H by lead 274, hence the changer transfer relay 394 pulls in and breaks the power circuit along leads 282 and 404 that would be established to payout motor 376 when a deposit is made in excess of the price of the article. Instead, such deposit will now establish a circuit along lead 282 through the lower contact of switch 398 and thence to the auxiliary coin payout motor 384. Operation of motor 394 and its associated switches 386 and 388 is the same as described above for the primary change payout motor 376.

Should the auxiliary coin tube become depleted, closure of switch 392 establishes the following electrical circuit: From lead 294 (at the potential of line H) through switch 392, through switch 400, along lead 414 to relay coil 408 and lamp 412, and thence to common line C. This energizes coil 408 of the correct change relay to open switch 410, thereby breaking the connection between leads 280 and 284 to prevent gating of SCR 300 unless money equal to the exact price of the article is deposited. The energization of lamp 412 informs the customer that correct change is required.

It should be noted that the antijackpot relay 334 will pull-in five seconds after vend relay coil 290 is energized if the accept coins relay 316 fails to drop out during the vend cycle as, for example, in the event the totalizer stepper should fail while stepping back to the correct price from an over-deposit condition. Closure of switch 338 of the antijackpot relay directly connects the return side of accept coins relay coil 318 to an extension of line H, thereby de-energizing the same. This prevents the vend motor and the operated change payout motor from continuously recycling to preclude jackpotting of the assocoated nickel storage tube and the product.

Having thus described the invention, what is claimed as new and desired to be secured by Letters Patent is:

1. In a vending machine:
 a deposit station having coin-responsive structure for sensing the deposit of coinage including a coin of predetermined denomination, and bill-responsive apparatus for sensing the deposit of a bill of predetermined value greater than said denomination;
 a deposit totalized operably associated with said structure and said apparatus and responsive to coinage deposit sensing by the structure for registering the total value of the deposited coinage, and responsive to bill deposit sensing by said apparatus for registering a deposit equal to said denomination;
 dispensing means for vending an article at a price no greater than said predetermined value;
 vend initiating means coupled with said totalizer and said dispensing means and operable to effect operation of the dispensing means in response to registration of a coinage deposit by the totalizer at least equal to said price; and
 bill-controlled means coupled with said apparatus and said initiating means and responsive to said bill deposit sensing for rendering the initiating means operable to effect operation of said dispensing means in response to registration of a deposit by the totalizer equal to said denomination.

2. The invention of claim 1; and
means coupled with said structure and said apparatus for effectively disabling the latter in response to said coinage deposit sensing, and for effectively disabling the structure in response to said bill deposit sensing.

3. The invention of claim 1; and
change payout means coupled with said initiating means for paying change to the customer when the dispensing means is operated in response to a deposit of greater monetary value than said price.

4. The invention of claim 1,
said totalizer having a series of deposit-registering terminals representing increments of monetary value including said price and said denomination, and means for sequentially addressing said terminals as deposits are sensed,
said dispensing means being responsive to application of electrical excitation thereto for effecting said vending of the article,
said totalizer cooperating with said initiating means, when the terminal representing said price is addressed, to provide a coinage-established energizing circuit through the totalizer to the dispensing means for operating the latter,
said bill-controlled means being coupled with the terminal representing said denomination and cooperating with the initiating means and the totalizer, when said denomination representing terminal is addressed in response to said bill deposit sensing, to provide a bill-established energizing circuit through the totalizer to the dispensing means for operating the latter.

5. The invention of claim 4,
said addressing means having an electrical connection point common to said circuits and establishing electrical continuity between said point and individual terminals as the latter are sequentially addressed.

6. The invention of claim 5,
said initiating means including a price setter having a plurality of price representing connections including a first of said connections which represents said denomination and a second of said connections which represents said predetermined value, said bill-controlling means including switching means coupling said first connection with said denomination representing terminal during the deposit of coinage, and operable in response to said bill deposit sensing to couple said second connection with said denomination representing terminal and disconnect the first connection therefrom.

7. The invention of claim 4, wherein is further provided:

a pair of electrically responsive devices operably associated with said structure and normally maintaining deposited coinage in escrow, one of said devices accepting deposited coinage in escrow upon operation thereof, the other device returning deposited coinage in escrow upon operation of said other device, first normally energized relay means operably coupled with said one device for operating the latter to accept the coinage in escrow upon de-energization of said first relay means;

second normally energized relay means;

a deposit return switch coupled with said second relay means and operable to de-energize the latter;

circuit means coupling said other device with said second relay means through said first relay means for operating said second device to return the coinage in escrow in response to de-energization of the second relay means when the first relay means is energized; and circuitry coupled with said first relay means and said dispensing means and responsive to operation of the latter for de-energizing the first relay means, whereby coinage in escrow is accepted if vending of the article is effected, said apparatus including a bill escrow and being provided with electrically responsive control means for effecting the acceptance of said bill from escrow or, alternatively, effecting return of the bill from escrow, said control means being coupled with said first relay means and said circuit means and operated thereby when the bill is deposited, whereby the first and second relay means control the acceptance and return of either coinage or said bill.

8. In a vending machine:

a deposit station having coin-responsive structure for sensing the deposit of coinage into escrow;

dispensing means for vending an article at a predetermined price;

vend initiating means coupled with said structure and said dispensing means and operable, when the sensed deposit is at least equal to said price, to effect operation of the dispensing means;

a first electrically responsive device for effecting the acceptance of the deposit in escrow;

a second electrically responsive device for effecting the return of the deposit in escrow;

first normally energized relay means operably coupled with said first device for operating the latter to accept the deposit in escrow upon de-energization of said first relay means;

second normally energized relay means;

a deposit return switch coupled with said second relay means and operable to de-energize the latter;

circuit means coupling said second device with said second relay means through said first relay means for operating said second device to return the deposit in escrow in response to de-energization of the second relay means when the first relay means is energized; and circuitry coupled with said first relay means and said dispensing means and responsive to operation of the latter for de-energizing the first relay means, whereby the deposit in escrow is accepted if vending of the article is effected.

9. The invention of claim 8, said circuitry being coupled with said second relay means and including a cyclically operable control having means for resetting said first and second relay means to normal after expiration of a predetermined portion of said cycle if either of the same is de-energized, said dispensing means effecting the commencement of a cycle of operation of said control in response to operation thereof, said second relay means effecting the commencement of a cycle of operation of said control in response to de-energization thereof.

10. The invention of claim 8, said circuitry being coupled with said second relay means and including a cyclically operable control having means for resetting said first and second relay means to normal after expiration of a predetermined portion of said cycle if either of the same is de-energized, said first and second relay means being resettable exclusively by said circuitry whereby, if an interruption in electrical power to the machine should occur, the deposit in escrow is accepted when power is re-established before actuation of said switch is effective to return the deposit.

11. The invention of claim 8, said first and second relay means each including an electro-mechanical relay having a coil, said switch and said circuitry each being operable to apply like electrical potentials to both electrical sides of the respective coil to effect the de-energization thereof.

12. The invention of claim 8, said deposit station having bill-responsive apparatus for sensing the deposit of a bill of a value at least equal to said price, said initiating means being coupled with said apparatus and operable in response to bill deposit sensing to effect operation of the dispensing means, said apparatus including a bill escrow and being provided with electrically responsive control means for effecting the acceptance of said bill from escrow or, alternatively, effecting return of the bill from escrow, said control means being coupled with said first relay means and said circuit means and operated thereby when the bill is deposited, whereby the first and second relay means control the acceptance and return of either said coinage or said bill.

References Cited

UNITED STATES PATENTS

| | | | |
|---|---|---|---|
| 3,186,531 | 1/1965 | Adams | 194—4 |
| 3,190,426 | 1/1965 | Cahill et al. | 194—4 |
| 3,191,737 | 1/1965 | James et al. | 194—4 |

STANLEY H. TOLLBERG, *Primary Examiner.*